(12) United States Patent
Gorzynski

(10) Patent No.: US 7,940,293 B2
(45) Date of Patent: May 10, 2011

(54) VIDEO CONFERENCING SYSTEM

(75) Inventor: Mark E. Gorzynski, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1384 days.

(21) Appl. No.: 11/442,421

(22) Filed: May 26, 2006

(65) Prior Publication Data

US 2007/0285507 A1    Dec. 13, 2007

(51) Int. Cl.
*H04N 7/14* (2006.01)

(52) U.S. Cl. .................................................. 348/14.01

(58) Field of Classification Search ............... 348/14.01, 348/14.16
See application file for complete search history.

(56) References Cited

U.S. PATENT DOCUMENTS

| | | | |
|---|---|---|---|
| 6,042,235 A | 3/2000 | Machtig et al. | |
| 6,710,797 B1 * | 3/2004 | McNelley et al. | 348/14.16 |
| 6,889,120 B2 | 5/2005 | Jouppi | |
| 6,933,979 B2 | 8/2005 | Gonzales et al. | |
| 2004/0165060 A1 | 8/2004 | McNelley et al. | |
| 2005/0024484 A1* | 2/2005 | Leonard et al. | 348/14.01 |
| 2005/0209012 A1 | 9/2005 | JoUppi | |
| 2005/0237381 A1 | 10/2005 | White | |
| 2005/0237382 A1* | 10/2005 | White | 348/14.16 |

* cited by examiner

*Primary Examiner* — Stella L Woo

(57) ABSTRACT

A video conferencing system includes a camera and a display within a room. The camera is directed towards participants in a foreground against a background. The room has lighting defining at least foreground luminance. The display defines maximum display luminance, and the display and flare of the room define minimum display luminance. The camera, the display, and/or the room are adapted to provide one or more of the following. First, that the maximum display luminance is greater than the foreground luminance but less than the foreground luminance times a first constant. Second, that the maximum display luminance is greater than the minimum display luminance by more than a second constant. Third, that illumination color of foreground images displayed on the display substantially match illumination color of the foreground. Fourth, that a color of background images displayed on the display substantially matches a color of the background.

24 Claims, 3 Drawing Sheets

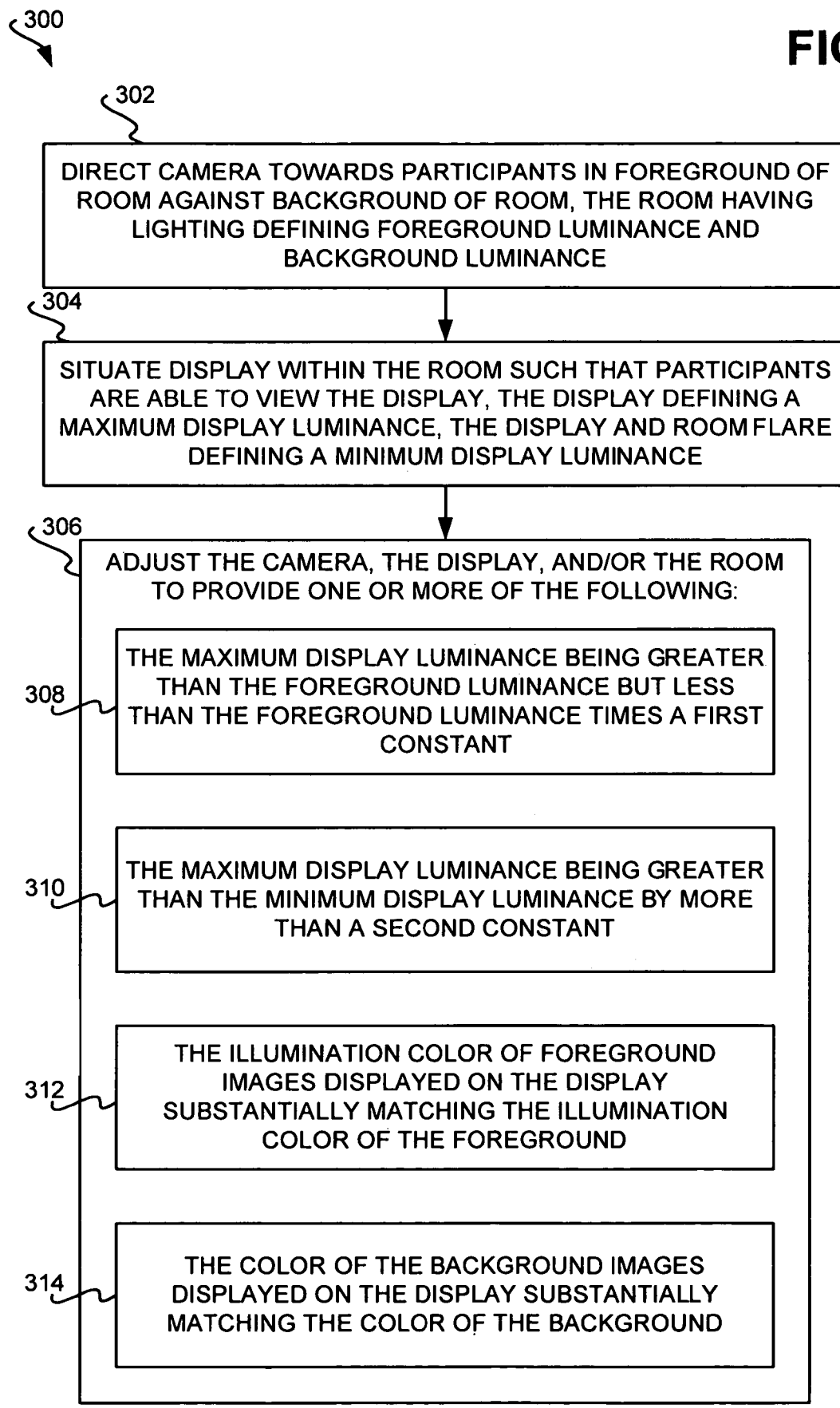

VIDEO CONFERENCING SYSTEM

BACKGROUND

To reduce meeting costs and promote more spontaneous meetings, many organizations are turning to video conferencing systems. In a typical video conferencing system, a local room has a display and a camera, and a remote room has a display and a camera. The two rooms are communicatively connected to one another. Images and sound of participants in the local room are displayed on the display at the remote room, and images and sound of participants in the remote room are displayed on the display at the local room.

While video conferencing systems have successfully reduced meeting costs and have promoted more spontaneous meetings, they are not without drawbacks. In particular, even when using large displays, it may not be possible to overcome the sense of the local participants that the remote participants are not in the same room, and are only "on TV." As such, the remote participants may not be treated as equal members of the meeting, reducing the likelihood that video conferencing will be used for some types of meetings, such as critical meetings.

BRIEF DESCRIPTION OF THE DRAWINGS

FIG. 3 is a flowchart of a method, according to an embodiment of the invention.

DETAILED DESCRIPTION OF THE DRAWINGS

Figure 1:
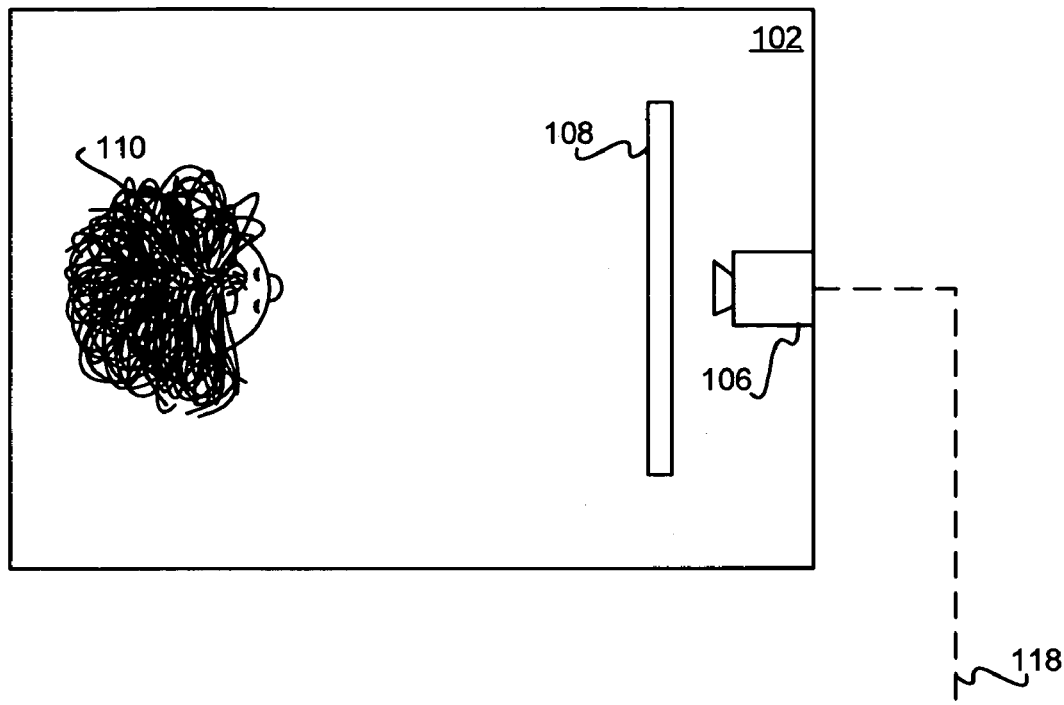
FIG. 1 is a diagram of a typical video conferencing setup, according to an embodiment of the invention.
Figure 1:
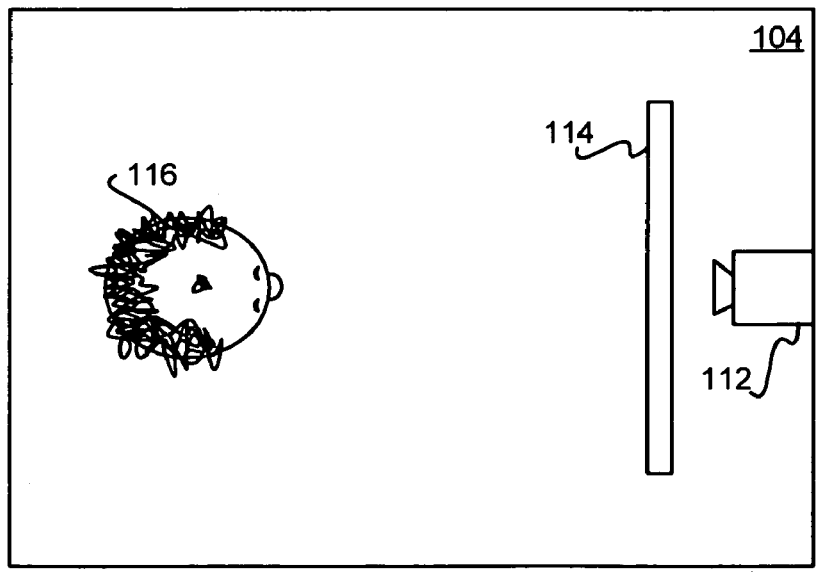

FIG. 1 shows a typical and rudimentary video conferencing setup 100, according to an embodiment of the invention. Within a first room 102 there is a camera 106 and a display 108, whereas within a second room 104 there is also a camera 112 and a display 114. The first room 102 includes a participant 110 and the second room 104 includes a participant 116. As can be appreciated by those of ordinary skill within the art, there may be more than two rooms within the setup 100. Furthermore, there may be more than one camera, display, and/or participant in one or more of these rooms.

The rooms 102 and 104 may be located great distances apart, but are communicatively connected to one another. That is, the camera 106 and the display 108 are communicatively connected to the camera 112 and the display 114, as indicated by the dotted line 118 in FIG. 1. Images and optionally sound of the participant 110 is electronically captured by the camera 106 in the first room 102 and these captured images are displayed and the sound optionally output by the display 114 in the second room 104. Likewise, images and optionally sound of the participant 116 is electronically captured by the camera 112 in the second room 104 and displayed and these captured images are displayed and the sound optionally output by the display 108 in the first room 102.

Thus, the video conferencing setup 100 enables the participants 110 and 116 to have a meeting without having the participants 110 and 116 being physically located in the same room. At least some embodiments of the invention are concerned with improving the immersive aspects of the video conferencing setup 100. That is, at least some embodiments are concerned with increasing the sense of the participant 110 that the participant 116 is "live" and in the room 102, as opposed to being in a remote room 104, and with increasing the sense of the participant 116 that the participant 110 is "live" and in the room 104, as opposed to being in a remote room 104. Such techniques for improving the immersion of the setup 100 are now described in detail.

Figure 2A:
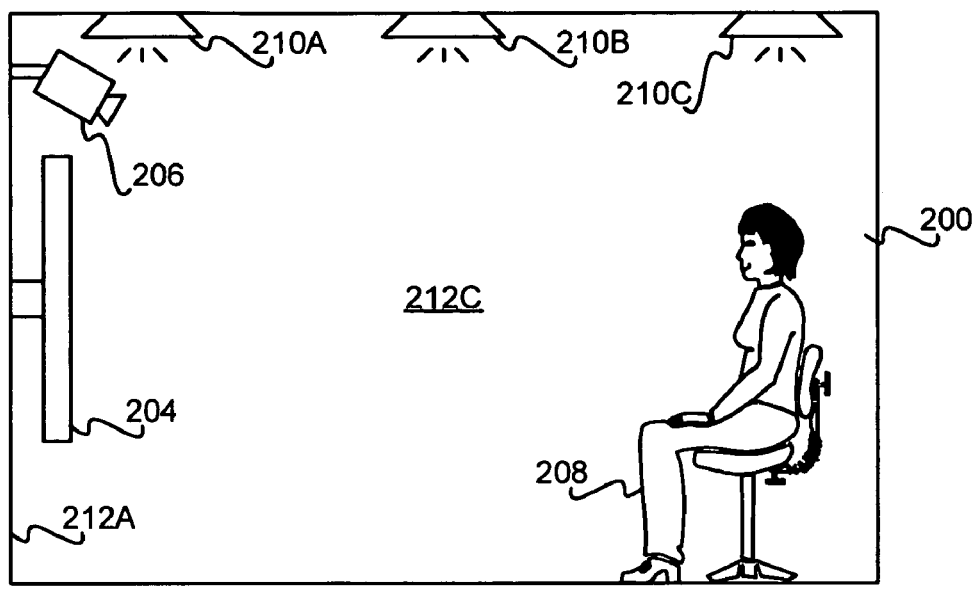
FIGS. 2A and 2B are diagrams of one room of the typical video conferencing setup of FIG. 1, according to an embodiment of the invention.
Figure 2B:
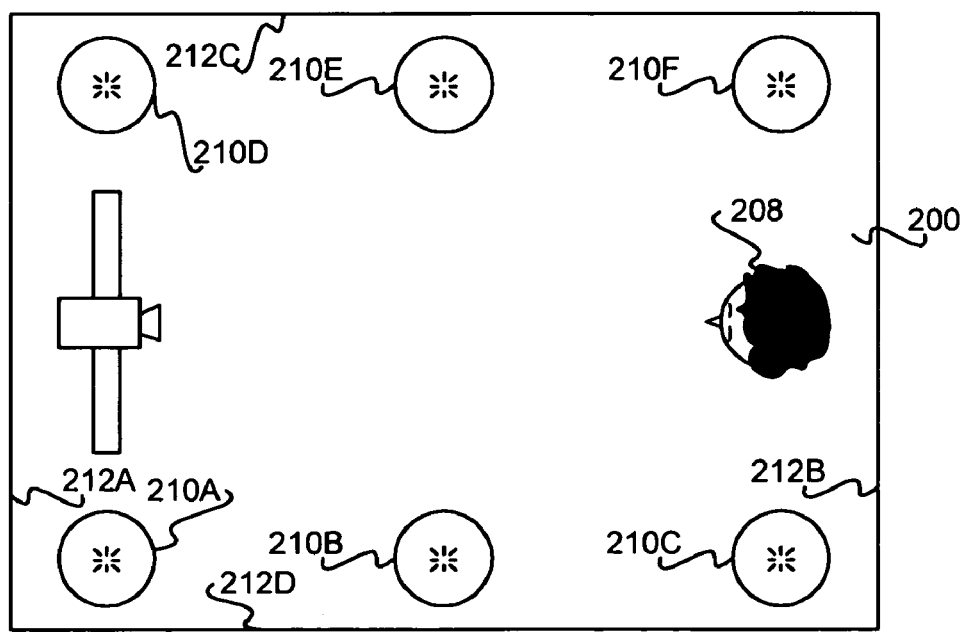

FIGS. 2A and 2B show a front view and a top view, respectively, of a single room 200 of a video conferencing setup, according to an embodiment of the invention. The single room 200 is typical of and can implement either of the rooms 102 and 104 of FIG. 1 that have been described. The room includes a video conferencing system including at least a display 204 and a camera 206. It can be appreciated that there may be more than one display 204 and more than one camera 206 located within the room 200.

The camera 206 is directed towards a participant 208, and there may be more than one such participant within the room 200. The camera 206 thus captures images and optionally sounds of the participant 208 for display on a remote display within a remote room. By comparison, the display 204 displays images and optionally outputs sounds of one or more participants located in that remote room.

The room 200 includes lighting 210A, 210B, 210C, 210D, 210E, and 210F, collectively referred to as the lighting 210. Whereas the lighting 210 includes six discrete lighting units, there may be more or less such lighting units, and the lighting may be continuous instead of or in addition to being discrete. Furthermore, whereas the lighting 210 is depicted in FIG. 2 as being overhead lighting, it may additionally or alternatively be sidewall lighting as well.

The room 200 includes walls 212A, 212B, 212C, and 212D, collectively referred to as the walls 212. The wall 212A is referred to as the front wall, as it is the wall that the display 204 is most near. The wall 212B is referred to as the back wall, as it is the wall that is behind the participant 208. Thus, the front wall 212A is opposite the back wall 212B. The walls surrounding the display 204 including the front wall 212A, as well as portions of the side walls 212C and 212D, but not the back wall 212B.

The camera 206 is more specifically directed towards the participant 208 in a foreground against a background. The foreground is defined by a focal plane of the camera 206, such that the camera 206 is said to focus at least on the participant 208. The focal plane may be non-restrictively defined as the plane onto which the lens or sensor of the camera 206 is focused. The background includes the back wall 212B.

The lighting 210 of the room 200 emits optical radiation defining a foreground illumination. The foreground illumination results in a brightness of the foreground, including the participant 208, as illuminated by the lighting 210 within the room 200. Brightness is particularly the perceptual response to optical radiation, where the human visual system (HVS) has a nonlinear perceptual response to optical radiation. In one embodiment, brightness can be defined as luminance. Luminance is defined as luminous intensity per unit projected area, such as candelas per meter squared. Thus, ultimately, the lighting 210 of the room 200 defines a foreground luminance, which is a brightness of the foreground in one embodiment.

The lighting 210 of the room 200 also emits optical radiation defining a background illumination. The background illumination results in a brightness of the background, including the back wall 212B, as illuminated by the lighting 210 within the room 200, where brightness can be defined as luminance in one embodiment. Thus, ultimately, the lighting 210 of the room 200 defines a background luminance, which is a brightness of the background in one embodiment. The background illumination and the foreground illumination are set via the lighting 210 within the room 200 such that the background luminance is less than the foreground luminance. The back wall 212B is further specified as being of at least a substantially solid color, and having a consistent texture over its entirety.

The display 204 of the room 200 defines a maximum display luminance. The maximum display luminance is the maximum luminance of an image being displayed by the display 204, such as a completely white image being displayed by the display 204 with maximum intensity. Characteristics of the display 204 itself dictate the maximum display luminance. For instance, some types of displays can display more ruminant, and hence lighter, images than other types of displays. The maximum display luminance of the display 204 is not determined or influenced by the lighting 210 of the room 200.

The display 204 together with flare of the room 200 defines a minimum display luminance. Flare of the room 200 is ambient light, including light from the lighting 210 as well as other ambient light, such as daylight, that is reflected by the display 204. The minimum display luminance is the minimum luminance of an image being displayed by the display 204, such as a completely black image being displayed by the display 204 with minimum intensity. Characteristics of the display 204 itself influence the minimum display luminance, along with room flare. For instance, some types of displays have backlighting, such that the color black when displayed by a display is not true black, but rather dark gray. Furthermore, even when a display is capable of displaying true black, room flare means that some ambient light will be reflected by the display, such that this true black is perceived as being dark gray to some extent.

The maximum display luminance can be referred to as the white level of the display 204, whereas the minimum display luminance can be referred to as the black level of the display 204. Contrast of the display 204 is defined as the ratio of maximum display luminance to minimum display luminance, or of the display's white level to the display's black level. Whereas the maximum display luminance is dictated by the display 204 itself, the minimum display luminance is dictated by the display 204 together with room flare, as has been described.

The walls surrounding the display 204, including the wall 212A, and at least the portions of the walls 212C and 212D near the display 204, are illuminated by the lighting 210 less than other parts of the room 200, such as the wall 212B and the other portions of the walls 212C and 212D. That is, the lighting 210 is set so that the walls surrounding the display 204 are illuminated less than other parts of the room 200. Such setting of the lighting 210 decreases room flare against the display 204.

The back wall 212B of the background has a color having a lightness less than the lightness of the color of the walls surrounding the display 204, including the wall 212A, and at least the portions of the walls 212C and 212D near the display 204. That is, the wall 212B may have the same color as the walls 212A, 212C, and 212D. However, the lightness of the color of the wall 212B is darker (i.e., less light) than the color of these other walls.

Lightness as used in this context is different than luminance or brightness, in that the inherent lightness of the color of the wall 212B, apart from the luminance of the wall 212B resulting from illumination by the lighting 210, is less than the inherent lightness of the color of the walls 212A, 212C, and 212D. For instance, a darker shade of the same color may be used to paint the wall 212B, and a lighter shade of the same color may be used to paint the walls 212A, 212C, and 212D. Setting the lightness of the color of the walls 212 in this respect compensates for lesser illumination by the lighting 210 of the walls surrounding the display 204 as compared to the greater illumination or luminance by the lighting 210 of the back wall 212B, as has been described.

Thus far, techniques have been described that improve the immersive quality of video conferencing within the room 200 of FIG. 2. For instance, the background luminance has been described as being specified as less than the foreground luminance, and the walls surrounding the display 204 have been described as being illuminated by the lighting 210 less than other parts of the room 200 are to decrease room flare. As another example, the back wall 212B of the background has been described as having a color with lightness less than the lightness of the color of the walls surrounding the display 204 to compensate for lesser illumination or luminance of these latter walls.

Therefore, what is described next is how the camera 206, the display 204, and the room 200 can be interactively adapted to further improve the immersive quality of the video conferencing within the room 200. That is, apart from how qualities of the camera 206, the display 204, and the room 200 itself (e.g., including the lighting 210 and the walls 212) are individually specified to improve video conferencing immersion, the qualities of the camera 206, the display 204, and the room 200 can further be interrelated to one another. Such specific manners of interrelation further improve video conferencing immersion. These specific manners can be employed individually or together to improve immersion.

First, the camera 206, the display 204, and/or the room 200 can be adapted so that the maximum display luminance is greater than the foreground luminance, but less than the foreground luminance times a constant. For instance, the maximum display luminance of the display 204 may be set so that it is greater than the luminance of the foreground, as illuminated by the lighting 210, but less than this foreground luminance times a constant of two or about two. Setting the maximum display luminance as related to the foreground luminance in this respect is one technique that improves the immersive quality of the video conferencing.

Second, the camera 206, the display 204, and/or the room 200 can be adapted so that the maximum display luminance is greater than the minimum display luminance by more than a second constant. For instance, the maximum display luminance of the display 204 may be set so that it is greater than the minimum display luminance, as defined by the display 204 and the room flare, by a constant of 150 or about 150. That is, the contrast of the display 204 is set so that it is greater than this constant. Setting the maximum display luminance as related to the minimum display luminance in this is respect is another technique that improves the immersive quality of the video conferencing.

Third, the camera 206, the display 204, and/or the room 200 can be adapted so that the illumination color of foreground images displayed on the display 204 substantially match the illumination color of the foreground within the room 200 itself. As has been described in relation to FIG. 1, for instance, a camera at a remote location may be communicatively coupled to the display 204, where this camera is directed towards one or more remote participants in a remote foreground against a remote background at the remote location. The foreground images displayed on the display 204 are thus of the remote foreground at this remote location.

Therefore, the lighting 210 and/or the display 204 can be adjusted so that the illumination color of the remote foreground images displayed on the display 204 substantially match the illumination color of the foreground within the room 200 itself, which includes the participant 208. Illumination color refers to the color of the light that is used to illuminate objects. With respect to the room 200, the color of the lighting 210 is the color of illumination illuminating the foreground of the room 200. With respect to the remote foreground images displayed on the display 204, the color of the remote lighting is primarily responsible for the color of illumination illuminating this remote foreground. However, the display 204 itself may be able to be adjusted so that the color of illumination illuminating the foreground images displayed on the display 204 is modified to match the color of the lighting 210 within the room 200 itself.

The color of illumination in one embodiment is directly related to the temperature of the lighting in question, where as has been noted above, the display 204 may be able to be adjusted so that the perceived illumination color of images being displayed by the display 204 is modified. For example, the CIE has defined a number of white illuminants. The CIE illuminant D65 corresponds to daylight illumination at noon, at about 6504 degrees Kelvin (° K). The CIE illuminant A corresponds to incandescent or tungsten illumination, at about 2856° K. CIE illuminants F2, F7, and F11 correspond to fluorescent illumination at 4100° K, 6000° K, and 4000° K, respectively. Therefore, the display 204 and/or the lighting 210 can be adapted so that the color illumination temperature of the foreground within the room 200 substantially matches the color illumination of the remote foreground images displayed on the display 204, as another technique to improve video conferencing immersion.

Fourth, the camera 206, the display 204, and/or the room 200 can be adapted so that the color of the background images displayed on the display 204 substantially matches the color of the background within the room 200 itself. As has been described in relation to FIG. 1, for instance, a camera at a remote location may be communicatively coupled to the display 204, where this camera is directed towards one or more remote participants in a remote foreground against a remote background at the remote location. The background images displayed on the display 204 are thus of the remote background at this remote location.

Therefore, the room 200 (specifically, the wall 212B) and/or the display 204 can be adjusted so that the color of the of the remote background images displayed on the display 204 substantially match the color of the background within the room 200 itself. For example, the color of the wall 212B may be a first shade of beige, and the remote background images displayed on the display 204 may be of a back wall of the remote location that are of a second shade of beige. The wall 212B and/or the display 204 can thus be adjusted so that these two colors substantially match, and are of the same shade of beige. The wall 212B may be repainted, for instance, or the display 204 may be able to be adjusted so that the color of the wall 212B matches the color of the remote background images displayed on the display 204. This is another technique to improve video conferencing immersion.

FIG. 3 shows a method 300 for setting up and improving the immersive quality of a video conferencing system, according to an embodiment of the invention. The method 300 pertains to the setting up of one room within which a video conferencing system is installed. The method 300, however, may be performed for each such room. The method 300 is particularly described in relation to FIGS. 2A and 2B.

First, the camera 206 is directed towards the participants, such as the participant 208, in the foreground of the room 200 against the background of the room 200 that includes the back wall 212B (302). The room 200 has lighting 210 that defines foreground luminance, as has been described. The lighting 210 also defines background illumination luminance, as has been described.

Second, the display 204 is situated within the room 200 so that the participants, such as the participant 208, are able to view the display 204 (304). The display 204 defines a maximum display luminance. The display and flare of the room 200 together define a minimum display luminance.

Third, the camera 206, the display 204, and/or the room 200 itself, such as at least one of the walls 212 thereof, are adjusted to provide one or more of the following, all of which relate to improving video conferencing immersion (306). First, adjustment may be made so that the maximum display luminance is greater than the foreground luminance, but less than the foreground luminance times a first constant, such as two (308). Second, adjustment may be made so that the maximum display luminance is greater than the minimum display luminance by more than a second constant, such as 150 (310).

Third, adjustment may be made so that the illumination color of the foreground images displayed on the display 204 substantially matches the illumination color of the foreground within the room 200 itself (312). Fourth, adjustment may be made so that the color of the background images displayed on the display 204 substantially matches the color of the background within the room 200 itself (314). In one embodiment, video conferencing immersion perception is most enhanced where all four of these conditions are satisfied.

I claim:

1. A video conferencing system comprising:
   a camera within a room and directed towards one or more participants in a foreground against a background, the room having lighting defining at least a foreground luminance; and,
   a display within the room and defining a maximum display luminance, the display and flare of the room defining a minimum display luminance,
   in which one or more of the camera, the display, and the room provide
   the maximum display luminance being greater than the foreground luminance but less than the foreground luminance times a first constant.

2. The video conferencing system of claim 1, wherein the foreground is defined by a focal plane of the camera.

3. The video conferencing system of claim 1, wherein the lighting within the room further defines a background luminance, the background luminance being less than the foreground luminance.

4. The video conferencing system of claim 1, wherein the background comprises a back wall having a substantially solid color.

5. The video conferencing system of claim 1, wherein one or more walls surrounding the display are illuminated by the lighting less than other parts of the room to decrease the flare.

6. The video conferencing system of claim 5, wherein the background comprises a back wall having a color with lightness less than a lightness of a color of the walls surrounding the display to compensate for lesser illumination by the lighting of the walls surrounding the display as compared to the back wall.

7. The video conferencing system of claim 1, wherein the camera, the display, and the room are adapted to provide at least the maximum display luminance being greater than the foreground luminance but less than the foreground luminance times a first constant.

8. The video conferencing system of claim 7, wherein the first constant is at least about two.

9. The video conferencing system of claim 1, wherein the camera, the display, and the room are adapted to provide at least the maximum display luminance being greater than the minimum display luminance by more than the second constant.

10. The video conferencing system of claim 9, wherein the second constant is at least about 150.

11. The video conferencing system of claim 1, wherein the camera, the display, and the room are adapted to provide at least the illumination color of foreground images displayed on the display substantially matching the illumination color of the foreground.

12. The video conferencing system of claim 11, wherein the video conferencing system is communicatively connected to a camera at a remote location directed towards a remote participant in a remote foreground against a remote background at the remote location, such that the foreground images displayed on the display are of the remote foreground at the remote location.

13. The video conferencing system of claim 1, wherein the camera, the display, and the room are adapted to provide at least the color of the background images displayed on the display substantially matching the color of the background.

14. The video conferencing system of claim 13, wherein the video conferencing system is communicatively connected to a camera at a remote location directed towards a remote participant in a remote foreground against a remote background, such that the background images displayed on the display are of the remote background at the remote location.

15. A method comprising:
   directing a camera of a video conferencing system towards a participant in a foreground of a room against a background of the room, the room having lighting defining at least a foreground luminance;
   situating a display of the video conferencing system within the room such that the participant is able to view the display, the display defining a maximum display luminance, the display and flare of the room defining a minimum display luminance; and
   adapting one or more of the camera, the display, and the room to provide
      the maximum display luminance being greater than the foreground luminance but less than the foreground luminance times a first constant.

16. The method of claim 15, further comprising adapting one or more of the camera, the display, and the room to provide at least the maximum display luminance being greater than the minimum display luminance by more than a second constant.

17. The method of claim 16, further comprising adapting one or more of the camera, the display, and the room to provide at least the illumination color of foreground images displayed on the display substantially matching the illumination color of the foreground.

18. The method of claim 17, further comprising adapting one or more of the camera, the display, and the room to provide at least the color of the background images displayed on the display substantially matching the color of the background.

19. A video conferencing system comprising:
   a camera that electronically captures at least images of a participant in a foreground of a room against a background of the room, the room having lighting defining at least a foreground luminance; and
   a display that displays captured images of a remote participant to the participant, the display defining a maximum display luminance, the display and flare of the room defining a minimum display luminance,
   in which one or more of the camera, the display, and the room provide
      the maximum display luminance being greater than the minimum display luminance by more than a first constant.

20. The video conferencing system of claim 19, in which the camera, the display, and the room are adapted to provide at least the maximum display luminance being greater than the foreground luminance but less than the foreground luminance times a second constant.

21. The video conferencing system of claim 20, in which the second constant is at least about two.

22. The video conferencing system of claim 19, in which the first constant is at least about 150.

23. The video conferencing system of claim 19, in which the camera, the display, and the room are adapted to provide at least the illumination color of foreground images displayed on the display substantially matching the illumination color of the foreground.

24. The video conferencing system of claim 19 in which the camera, the display, and the room are adapted to provide at least the color of the background images displayed on the display substantially matching the color of the background.

* * * * *